(12) United States Patent
Voss et al.

(10) Patent No.: US 8,189,254 B2
(45) Date of Patent: May 29, 2012

(54) RF INTERFERENCE REDUCTION FOR FUNCTIONAL GLAZINGS

(75) Inventors: Jonathan Peter Voss, Croston (GB); Peter Paulus, Muenster (DE)

(73) Assignees: Pilkington Group Limited, St. Helens, Merseyside (GB); Pilkington Automotive Deutschland GmbH, Witten (DE)

( * ) Notice: Subject to any disclaimer, the term of this patent is extended or adjusted under 35 U.S.C. 154(b) by 0 days.

(21) Appl. No.: 12/667,428

(22) PCT Filed: Jul. 3, 2008

(86) PCT No.: PCT/GB2008/050533
§ 371 (c)(1),
(2), (4) Date: Jan. 28, 2010

(87) PCT Pub. No.: WO2009/004385
PCT Pub. Date: Jan. 8, 2009

(65) Prior Publication Data
US 2010/0165436 A1 Jul. 1, 2010

(30) Foreign Application Priority Data
Jul. 3, 2007 (GB) .................................. 0712826.7

(51) Int. Cl.
*G02F 1/01* (2006.01)
(52) U.S. Cl. ..................................................... 359/238
(58) Field of Classification Search ........... 359/265–275
See application file for complete search history.

(56) References Cited

U.S. PATENT DOCUMENTS

| 4,896,030 A | * | 1/1990 | Miyaji .......................... 250/206 |
| 4,943,886 A | | 7/1990 | Quazi |
| 5,091,258 A | * | 2/1992 | Moran .......................... 428/437 |
| 5,365,365 A | | 11/1994 | Ripoche et al. |
| 5,408,353 A | | 4/1995 | Nichols et al. |
| 5,409,734 A | | 4/1995 | Lee et al. |
| 5,523,877 A | * | 6/1996 | Lynam .......................... 359/275 |
| 5,920,363 A | | 7/1999 | Rofe |
| 6,055,088 A | | 4/2000 | Fix et al. |

(Continued)

FOREIGN PATENT DOCUMENTS
EP 0910136 A 4/1999

OTHER PUBLICATIONS

International Search Report (PCT/ISA/210) for PCT/GB2008/050533 mailed Nov. 4, 2008.

(Continued)

*Primary Examiner* — Ricky Mack
*Assistant Examiner* — Tuyen Tra
(74) *Attorney, Agent, or Firm* — Buchanan Ingersoll & Rooney PC

(57) ABSTRACT

An automotive vehicle having an aperture in the vehicle body in which a glazing, comprising a switchable film laminated between at least two plies of an interlayer material is fitted is disclosed. The plies of interlayer material are laminated between a first ply of glazing material, preferably glass, facing out of the vehicle and a second ply of glazing material, preferably glass, facing into the vehicle. The switchable film comprises first and second electrodes, both in electrical connection with a power supply. The first electrode is capacitively connected to electrical ground on the vehicle body.

29 Claims, 6 Drawing Sheets

U.S. PATENT DOCUMENTS

| | | | |
|---|---|---|---|
| 6,210,008 B1 * | 4/2001 | Hoekstra et al. | 359/603 |
| 6,379,013 B1 | 4/2002 | Bechtel et al. | |
| 6,402,328 B1 | 6/2002 | Bechtel et al. | |
| 6,816,297 B1 * | 11/2004 | Tonar et al. | 359/265 |
| 6,995,891 B2 * | 2/2006 | Agrawal et al. | 359/265 |
| 7,248,392 B2 * | 7/2007 | Rukavina et al. | 359/275 |
| 7,746,614 B2 * | 6/2010 | Ishikawa et al. | 361/93.1 |
| 2002/0135881 A1 | 9/2002 | Rukavina et al. | |
| 2004/0008527 A1 | 1/2004 | Honda | |
| 2005/0231336 A1 | 10/2005 | Strohband et al. | |

OTHER PUBLICATIONS

"Funkentstörung"; Wikipedia [online]; Apr. 23, 2007; XP002500893; Retrieved from the internet: URL:http://de.wikipedia.org/w/index.php?title=Funkentst%C3%B6rung&diff=30883866&oldid=25513054#Entst.C3.B6rung_mit_X-Y-Kondensatoren>; 10 pages (with English translation).

Search Report Under Section 17 dated Nov. 2, 2007, issued in GB0712826.7, United Kingdom Intellectual Property Office, South Wales, GB.

Corrected Search Report Under Section 17 dated Nov. 2, 2007, issued in GB0712826.7, United Kingdom Intellectual Property Office, South Wales, GB.

Search Report Under Section 17 dated Mar. 12, 2008, issued in GB0712826.7, United Kingdom Intellectual Property Office, South Wales, GB.

International Preliminary Report on Patentability (Form PCT/IB/373) and Written Opinion of the International Search Authority (Form PCT/ISA/237) issued Jan. 5, 2010 in corresponding International Patent Application No. PCT/GB2008/050533, The International Bureau of WIPO, Geneva, CH.

Office Action issued Sep. 29, 2010 in corresponding European Patent Application No. 08 776 168.0-2124, European Patent Office, Munich, DE.

* cited by examiner

RF INTERFERENCE REDUCTION FOR FUNCTIONAL GLAZINGS

The present invention relates to the reduction of interference from switchable films incorporated in automotive glazings, in particular to the reduction of interference at radio frequencies caused by switchable films.

Glazings incorporating some sort of functional film, for example, a liquid crystal device (LCD) or suspended particle device (SPD) have become a sought after product for inclusion in automotive vehicles. Such glazings are switchable: having a transparent or light transmitting state, switchable to an opaque or dark state. The switchable film is laminated within a glazing construction typically comprising two plies of glass and two plies of an interlayer material, between which the switchable film is laminated. In particular, switchable glazings find applications as rooflights, as disclosed in U.S. Pat. No. 5,111,329, or as privacy glass, either externally, as sidelights, or internally, between a driver and passenger compartment.

Although there are many advantages to using switchable glazings in vehicles, one problem arises where the vehicle is also equipped with an antenna for receiving radio signals integrated into a further glazing, such as a backlight. This is a particular concern for glazings comprising SPD switchable films. Radio frequency (RF) signals fall within the frequency range $10^5$ Hz to $10^9$ Hz, covering long-wave to FM and TV (television) frequency bands.

FIG. 1 is a schematic representation of a glazing comprising a switchable film installed as a rooflight in a vehicle. The glazing 1 comprises a function film having an upper 2 and lower 3 transparent electrode, both in electrical connection with a DC/AC converter 4. The converter 4 is itself connected electrically to ground 5 and to the vehicle battery 6 (not shown). The glazing 1 is fitted within an aperture 7 (shown as a dotted line) in the vehicle body 8. The converter 4 converts between DC at 12V to AC at approximately 100V, over a frequency range of 20 to 1000 Hz. This frequency range is far-removed from the radio frequency range defined above, and therefore should theoretically produce no interference with radio reception within the vehicle.

However, rather than producing a smooth sinusoidal waveform, most DC/AC converters, and indeed, some vehicle electronics, produce a non sinusoidal or imperfect waveform. Such waveforms also contain higher-order frequencies, reaching into the radio frequency band. It is possible to design the DC/AC converter in such a manner as to minimise this effect, for example, by using pulse width modulation (PWM). However, either as an alternative, or alongside PWM techniques, it is possible to filter the output of the DC/AC converter. An LC circuit or ferrite materials can be used to reduce higher-order frequencies.

In order to evaluate the paths along which electronic noise from the converter is coupled to the glass antenna, it is necessary to evaluate the electric fields generated around the glazing when in use. FIG. 2 is a schematic representation of a glazing comprising a switchable film installed as a rooflight in a vehicle, showing two different electric field effects. Electric fields A are generated by the voltage from the DC/AC converter between the two electrodes 2, 3 of the switchable film. However, as the distance between the two electrodes 2, 3 is small, generally less than 1 mm, these electric fields do not penetrate far outside the opening of the vehicle body 8, and cause no interference to glass-mounted antennae, which are typically placed 10 cm or more apart.

The DC/AC converters 4 used to supply power to the electrodes 2, 3 are sometimes designed to have a floating output, where the input is galvanically insulated from the output. This means that the output is not grounded to the vehicle body. If the AC voltage, including the higher-order frequencies, is transferred from the converter circuitry to both outputs of the converter in an unbalanced way, both the electrodes 2, 3 of the switchable film will have an AC voltage to ground including high-order frequencies. In this case, both electrodes 2, 3 will serve as an antenna to radiate the AC voltages. This creates the electric fields B, shown in FIG. 2, which penetrate much further into the vehicle body 8 than electric fields A. If an antenna, such as a backlight antenna is nearby, the reception will significantly be disturbed by these electric fields. Simple parasitic capacitance within the converter 4 or the printed circuit board within the converter 4 itself can cause electric fields B to be generated. Only a small parasitic capacitance, for example, 100 pF, is necessary for radio frequency interference to occur. The advantage of using a floating mode for the converter 4 however is that the risk of electric shock to passengers in the vehicle in which the glazing is fitted is minimised.

Consequently, although it is possible to design components to minimise the radio frequency interference caused by such glazings, there still exists a problem with the generation of electric fields that penetrate an appreciable distance into the body of the vehicle in which the glazing is fitted.

The present invention aims to address these problems by providing an automotive vehicle having an aperture in the vehicle body in which a glazing, comprising a switchable film laminated between at least two plies of an interlayer material, the plies of interlayer material being laminated between a first ply of glazing material facing out of the vehicle and a second ply of glazing material facing into the vehicle, is fitted, the switchable film comprising first and second electrodes, both in electrical connection with a power supply, wherein the first electrode is capacitively connected to electrical ground on the vehicle body.

By providing a capacitive connection, not only are stray fields avoided, but the floating state of the converter used to power the switchable film, such as an SPD, is avoided without the risk of electric shock injury to passengers within the vehicle.

Preferably the second electrode of the switchable film is also connected to electrical ground on the vehicle body.

Preferably, the first electrode of the switchable film is in electrical connection with a capacitor, which is connected to electrical ground on the vehicle body.

Preferably, at least one ply of glazing material has a functional coating on a portion of one surface. The first ply of glazing material may have an infrared reflective coating on a portion of one surface. Alternatively, the first ply of glazing material may have a low-emissivity coating on a portion of one surface. The second ply of glazing material may have a low-emissivity coating on a portion of one surface.

Alternatively, a ply of polymer material having a functional infrared reflective coating may be laminated between the switchable film and the first ply of glazing material.

The laminated glazing preferably comprises at least one layer of interlayer material interposed between the electrode and the functional coating.

The functional coating is preferably provided with a busbar. Desirably, the busbar is connected to electrical ground on the vehicle body. In this situation, the electrode and the functional coating form a capacitor.

Preferably, the functional coating has a sheet resistance of less than or equal to 30 Ohms/□.

Preferably, the glazing is substantially rectangular having four sides and the busbar is connected to electrical ground along at least one side of the glazing.

Additionally or alternatively, the first electrode may overlap the edges of the aperture in the vehicle body. In this case, the region of the car body overlapped by the electrode forms a capacitor.

Preferably, the switchable film is provided with first and second busbars connected to the first and second electrodes, and a third busbar, connected to a non-electrically conductive surface of the electrode, forming a capacitor.

Preferably, the switchable film is one of an SPD or an LCD film.

Preferably, the glazing material is glass. More preferably, the glass may be toughened, semi-toughened or annealed silicate float glass.

Alternatively, the glazing material may be a plastics material.

The interlayer material, the plies of glazing material or both may be coloured.

Additionally, the electrical supply to the first electrode may also be connected to the ground of the power supply by a capacitor.

The present invention also provides a method of reducing interference in radio frequency signals caused by glazings comprising switchable films, the switchable film comprising first and second electrodes in electrical connection with a power supply, comprising connecting at least the first electrode capacitively to electrical ground.

The present invention will now be described by way of example only, and with reference to the accompanying drawings, in which.

The present invention adopts the approach that is preferable to avoid the floating mode of the DC/AC converter 4 by providing suitable electrical connections between the glazing 1 and the vehicle body 8, whilst preventing possible electric shock injury to the vehicle passengers.

In the following description, the formulae:

$$C = \frac{\varepsilon A}{d} = \frac{\varepsilon_0 \varepsilon_r A}{d}$$

and $$I = 2 U \pi f C$$

where

| | | |
|---|---|---|
| C | capacitance (F) | |
| A | area (m$^2$) | |
| d | distance between plates (m) | |
| $\varepsilon$ | dielectric constant | |
| $\varepsilon_0$ | dielectric constant (in vacuo) | 8.854 × 10$^{-12}$ As/Vm |
| $\varepsilon_r$ | relative dielectric constant | 2 (PVB) |
| | | 6.5 (glass) |
| | | 1 (air) |
| f | frequency (Hz) | |
| U | voltage (V) | | are used to calculate capacitance and current respectively.

Figure 1:
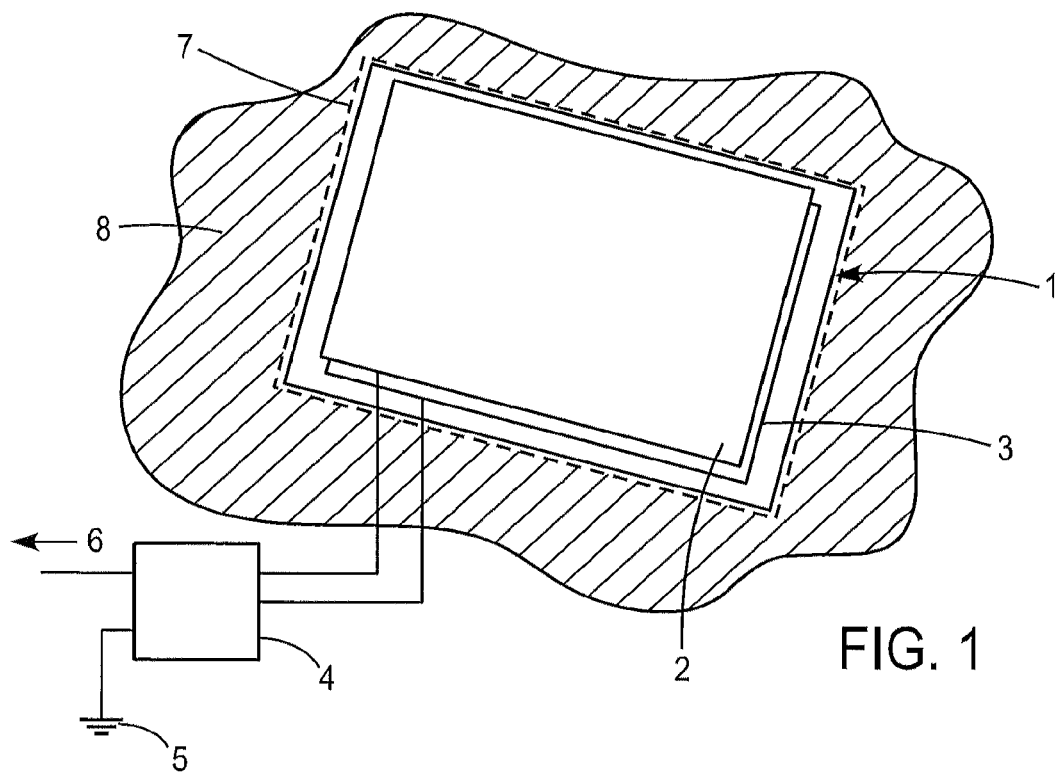
FIG. 1 is a schematic representation of a glazing comprising a switchable film installed as a rooflight in a vehicle.
Figure 2:
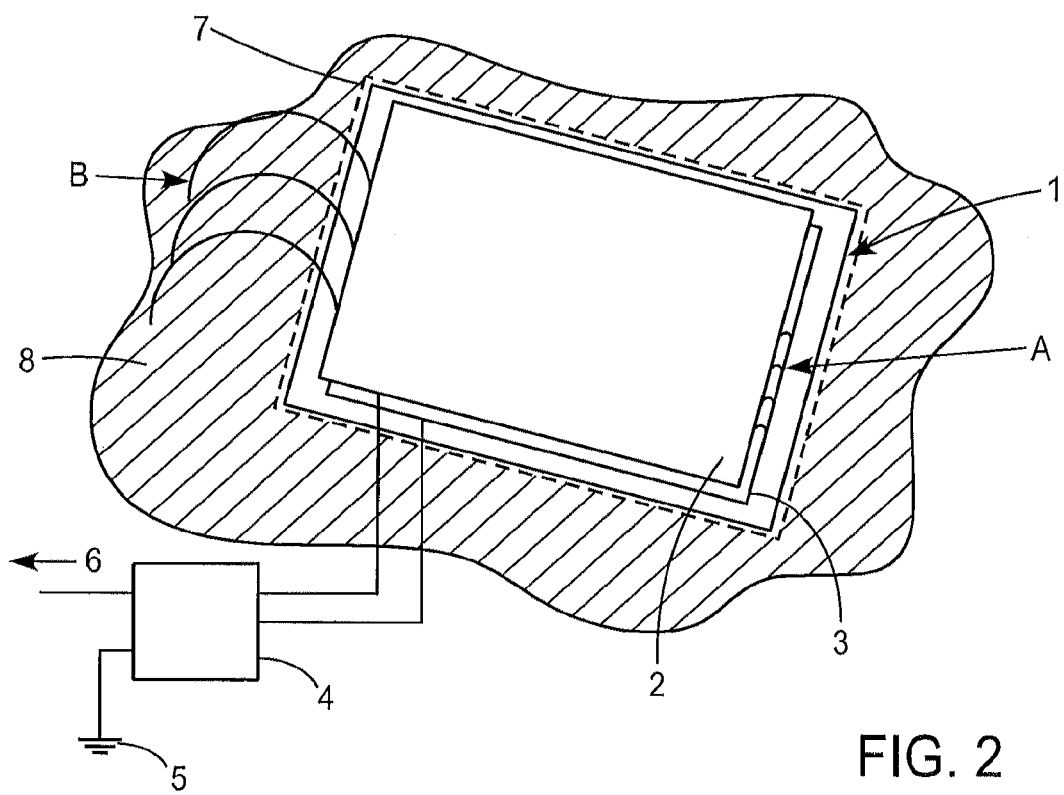
FIG. 2 is a schematic representation of a glazing comprising a switchable film installed as a rooflight in a vehicle, showing two different electric field effects.
Figure 3:
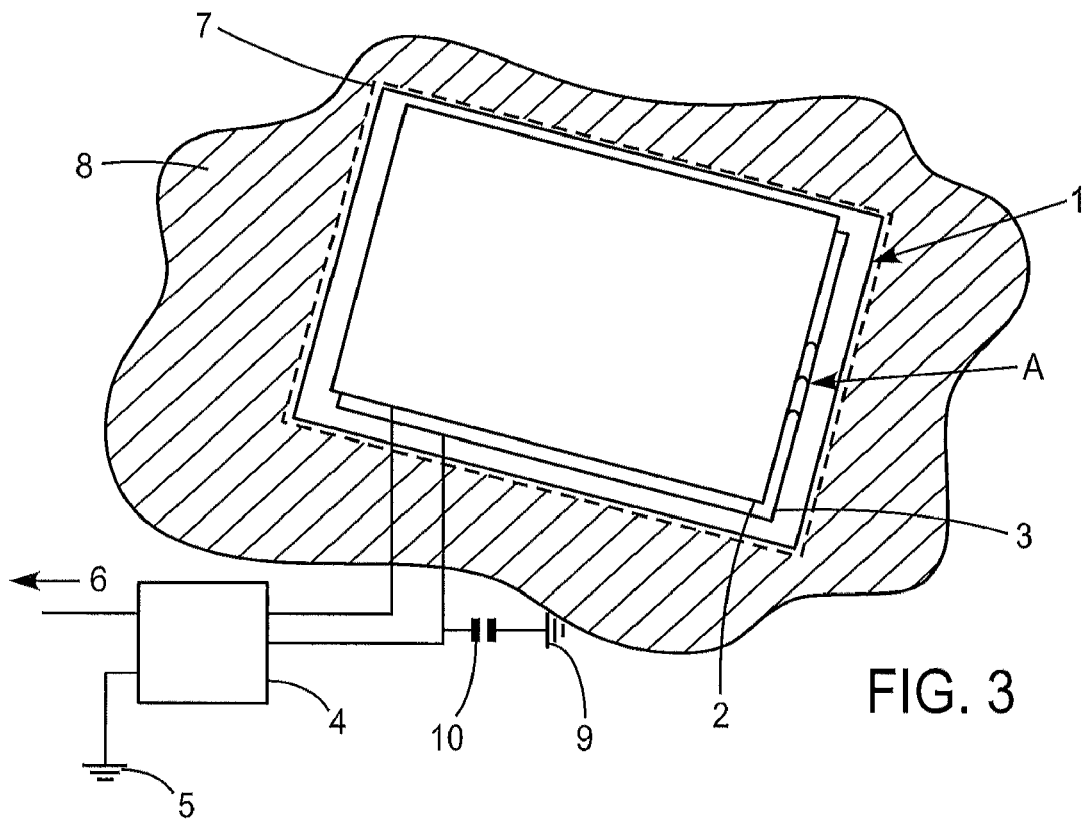
FIG. 3 is a schematic representation of a glazing comprising a switchable film installed in a vehicle in accordance with a first embodiment of the present invention.

FIG. 3 is a schematic representation of a glazing comprising a switchable film installed in a vehicle in accordance with a first embodiment of the present invention. As before, the glazing 1 comprises a switchable film having an upper 2 and lower 3 transparent electrode, both in electrical connection with a DC/AC converter 4. The converter 4 is itself connected electrically to ground 5 and to the vehicle battery (not shown). The glazing 1 is fitted within an aperture 7 (shown as a dotted line) in the vehicle body 8. The electrode 3 is connected to ground 9 on the vehicle body in the vicinity of the aperture 7 in which the glazing 1 is fitted in the vehicle body 8. In the present embodiment, a capacitor 10 is provided in electrical connection between the supply line to the second electrode 3 of the switchable film, and the car body. The capacitor may be part of the electrical cabling arrangement used to supply the electrodes of the switchable film. As a slight modification, it may be desirable to use a balanced grounding arrangement, where both electrodes 2, 3 are connected capacitively to ground. This could be achieved by connecting an additional capacitor 11 (not shown) between the second electrode 2 and ground 5. The benefit of balanced grounding is that it provides greater suppression of the electric fields "B" shown in FIG. 2.

Figure 4:
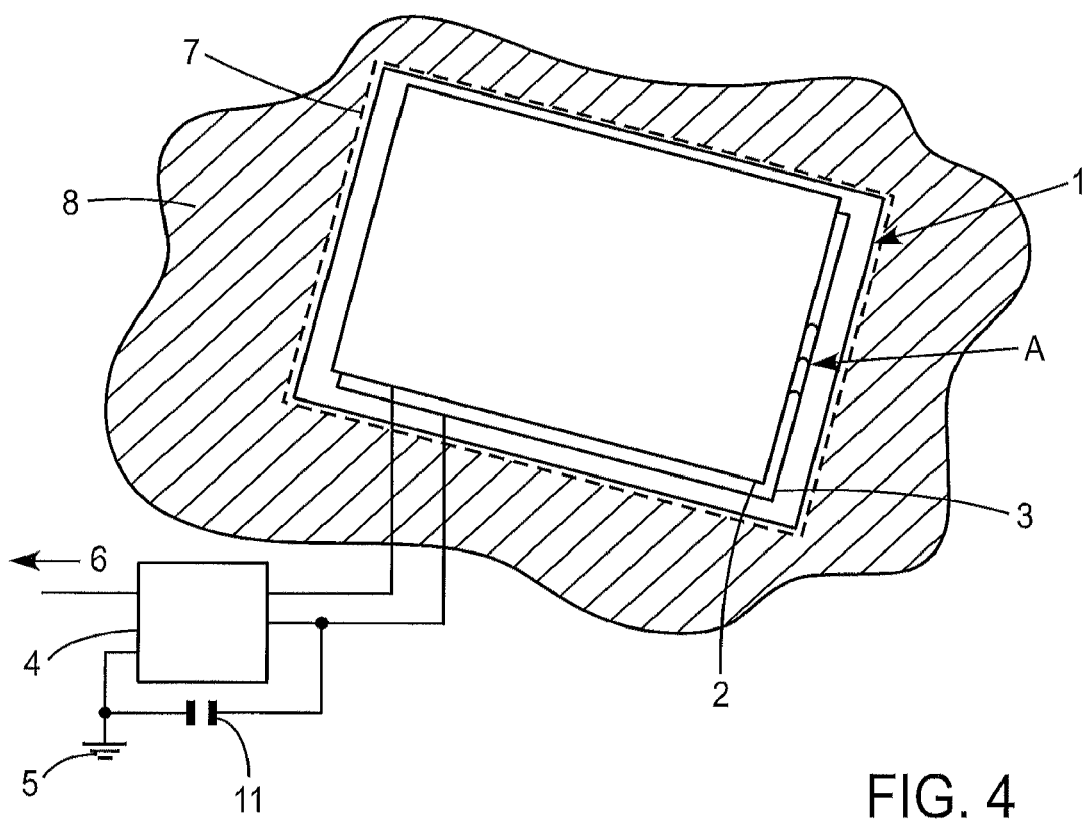
FIG. 4 is a schematic representation of a glazing comprising a switchable film installed in a vehicle in accordance with a second embodiment of the present invention.

FIG. 4 is a schematic representation of a glazing comprising a switchable film installed in a vehicle in accordance with a second embodiment of the present invention. In this embodiment, a capacitor 11 is provided as part of the power supply, providing a connection between the output to the switchable film and ground 5. Although the glazings shown are substantially rectangular (such as rooflights and backlights), the invention is applicable to other glazings having at least three sides (such as sidelights and vents). Again, as a slight modification, it may be desirable to use a balanced grounding arrangement, where both electrodes 2, 3 are connected capacitively to ground. This could be achieved by connecting an additional capacitor 11 between the second electrode 2 and ground 5.

The value of the capacitive coupling required is determined by taking two factors into consideration: the capacitance chosen must be large enough to effectively suppress the unbalanced higher order frequencies; and it must be suitable to limit the current induced into a person touching the vehicle body to below a safe limit, for example, 10 mA.

If, as described above, the interference in radio signals is caused by a stray parasitic capacitance of 100 pf, a suitable minimum value for the capacitance required to ground the switchable film is 10 nF. At a voltage of 100 V and a frequency of 400 Hz, 10 nF would limit the current to approx 0.25 mA.

Figure 5:
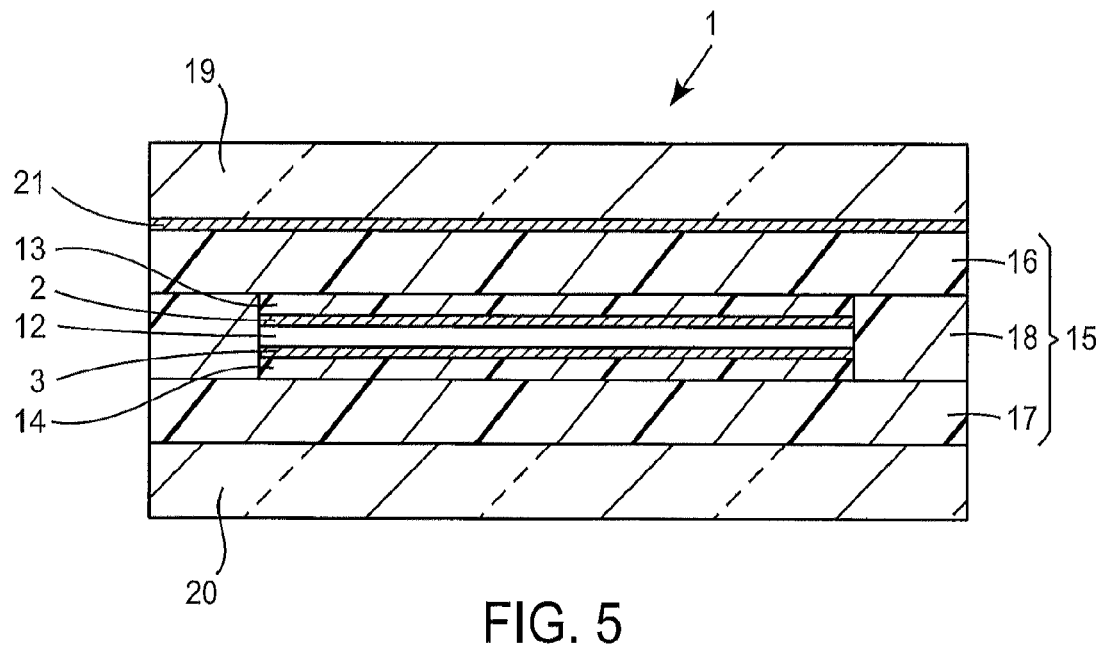
FIG. 5 is a schematic cross-section of a glazing construction illustrating a third embodiment of the present invention.

FIG. 5 is a schematic cross-section of a glazing construction illustrating a third embodiment of the present invention. The glazing 1 comprises a switchable film 12, having an upper electrode 2 comprising an electrically conductive film on a polymer substrate 13, such as polyethylene terephthalate, and a lower electrode 3, also comprising an electrically conductive film on a polymer substrate 14, such as polyethylene terephthalate. The switchable film 12 is laminated within the glazing as part of a picture frame arrangement 15. This comprises the film 12, laminated between first 16 and second 17 plies of an interlayer material, and positioned within a third ply of interlayer material 18, cut to accommodate the film 12 and electrodes 2, 3, as a frame. The picture-frame arrangement 15 is laminated between first 19 and second 20 plies of glass.

The first ply of glass 19 is provided with an infrared-reflective metallic film 21 on its lower surface, adjacent the picture-frame arrangement 15. The film 21 may be used as capacitive grounding for the glazing, as described below, with reference to FIG. 8.

Figure 6:
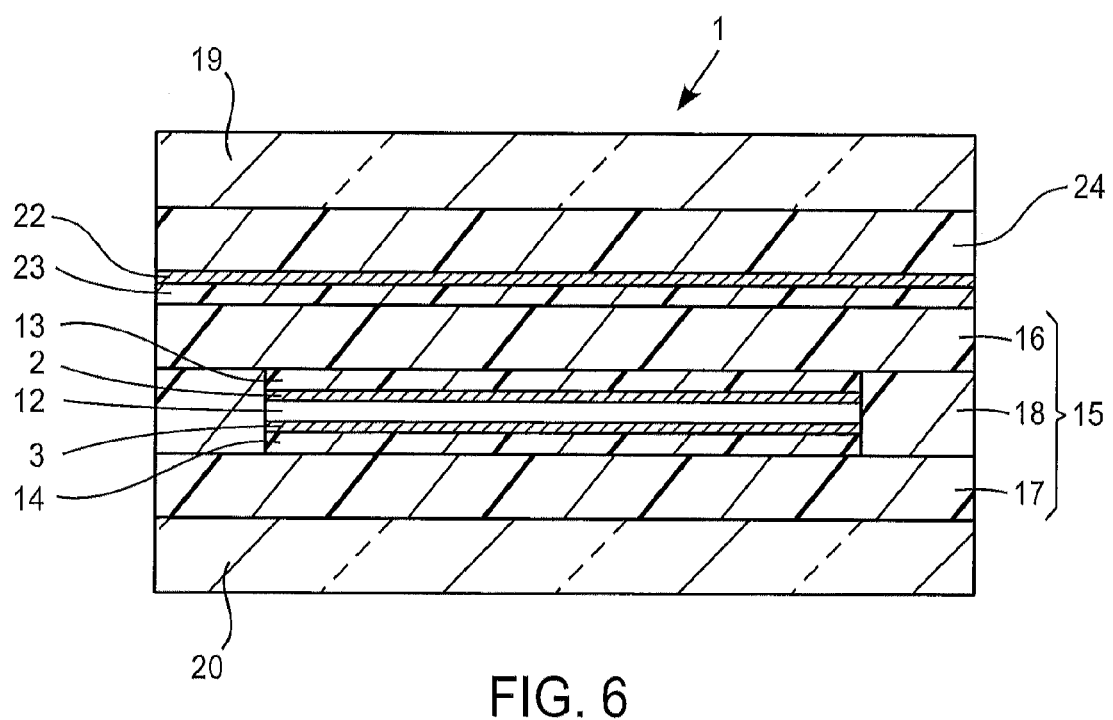
FIG. 6 is a schematic cross-section of a glazing construction illustrating a fourth embodiment of the present invention.

FIG. 6 is a schematic cross-section of a glazing construction illustrating a fourth embodiment of the present invention. The glazing 1 comprises a switchable film 12, having an upper electrode 2 comprising an electrically conductive film on a polymer substrate 13, such as polyethylene terephthalate, and a lower electrode 3, also comprising an electrically conductive film on a polymer substrate 14, such as polyethylene terephthalate. The switchable film 12 is laminated within the glazing as part of a picture frame arrangement 15. This comprises the film 12, laminated between first 16 and second 17 plies of an interlayer material, and positioned within a third ply of interlayer material 18, cut to accommodate the film 12 and electrodes 2, 3, as a frame. The picture-frame arrangement 15 is laminated between first 19 and second 20 plies of glass. Preferably, the coating used is a silver or tin oxide coating, sometimes known as solar control coating, although other infra-red reflective films or coatings may be used instead.

However, in this embodiment, rather than providing the first ply of glass 19 with an infrared-reflective film 21, as in the third embodiment, an infrared-reflective film 22, such as ITO (indium tin oxide) is provided on a polyethylene terephthalate substrate 23, laminated into the glazing 1 in conjunction with an additional ply of interlayer material 24 between the first ply of glass 19 and the infrared-reflective film 22. The film 22 may be used as capacitive grounding for the glazing, as described below, with reference to FIG. 8.

Figure 7:
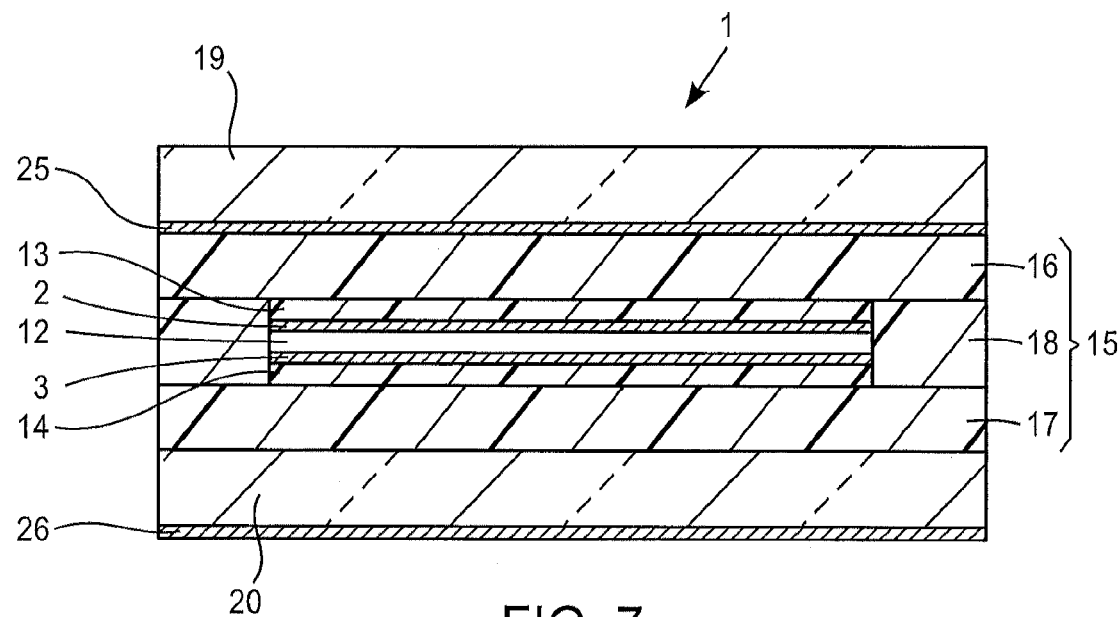
FIG. 7 is a schematic cross-section of a glazing construction illustrating a fifth embodiment of the present invention.

FIG. 7 is a schematic cross-section of a glazing construction illustrating a fifth embodiment of the present invention. The glazing 1 comprises a switchable film 12, having an upper electrode 2 comprising an electrically conductive film on a polymer substrate 13, such as polyethylene terephthalate, and a lower electrode 3, also comprising an electrically conductive film on a polymer substrate 14, such as polyethylene terephthalate. The switchable film 12 is laminated within the glazing as part of a picture frame arrangement 15. This comprises the film 12, laminated between first 16 and second 17 plies of an interlayer material, and positioned within a third ply of interlayer material 18, cut to accommodate the film 12 and electrodes 2, 3, as a frame. The picture-frame arrangement 15 is laminated between first 19 and second 20 plies of glass.

In this embodiment, the capacitive grounding is provided by a low-emissivity coating 25, 26. A low emissivity coating is a coating which when applied to clear, 3 mm thick float glass, results in the coated glass having an emissivity in the range of 0.05 to 0.45, the actual value being measured in accordance with EN 12898 (a published standard of the European Association of Flat Glass Manufacturers). The coating may be provided either online or offline, with each production route offering different emissivities. A hard (or pyrolytic) low emissivity coating may comprise a single layer of a metal oxide, preferably a transparent, electrically conductive oxide. Oxides of metals such as tin, zinc, indium, tungsten and molybdenum may be present in the metal oxide layer. Typically, the coating comprises a further dopant, such as fluorine, chlorine, antimony, tin, aluminium, tantalum, niobium, indium or gallium, for example, fluorine-doped tin oxide or tin-doped indium oxide may be used. Such coatings are generally provided with an underlayer, such as silicon or silicon oxynitride. The underlayer acts as a barrier to control migration of alkali metal ions from the glass and/or to suppress iridescent reflection colours caused by variations in thickness of the low emissivity layer.

Off-line (typically sputtered) low emissivity coatings typically comprise a multilayer coating stack, normally including at least one metal layer or electrically conductive metal compound layer, and a dielectric layer. Silver, gold, copper, nickel or chromium may be used as the metal layer, whereas indium oxide, antimony oxide or the like may be used as the electrically conductive compound. Typical multilayer stacks comprise one or two layers of silver deposited between layers of a dielectric such as an oxide of silicon, aluminium, titanium, vanadium, tin, or zinc. Individual layers of such coatings are typically tens of nanometers in thickness. Low emissivity coatings may be provided on either surface of the upper and lower plies of glass in the laminated glazing structure, depending on the combination of interlayers used and desired thermal performance.

The coating may be provided on the first ply of glass 19, adjacent the picture-frame arrangement, or on the second ply of glass 20, on the surface of the glass that faces into a vehicle when fitted, or on both plies of glass. If both plies of glass are provided with a coating, each of these coatings may be grounded, utilising the balanced grounding effect discussed above. The films 25 and/or 26 may be used as capacitive grounding for the glazing, as described below, with reference to FIG. 8.

Figure 8:
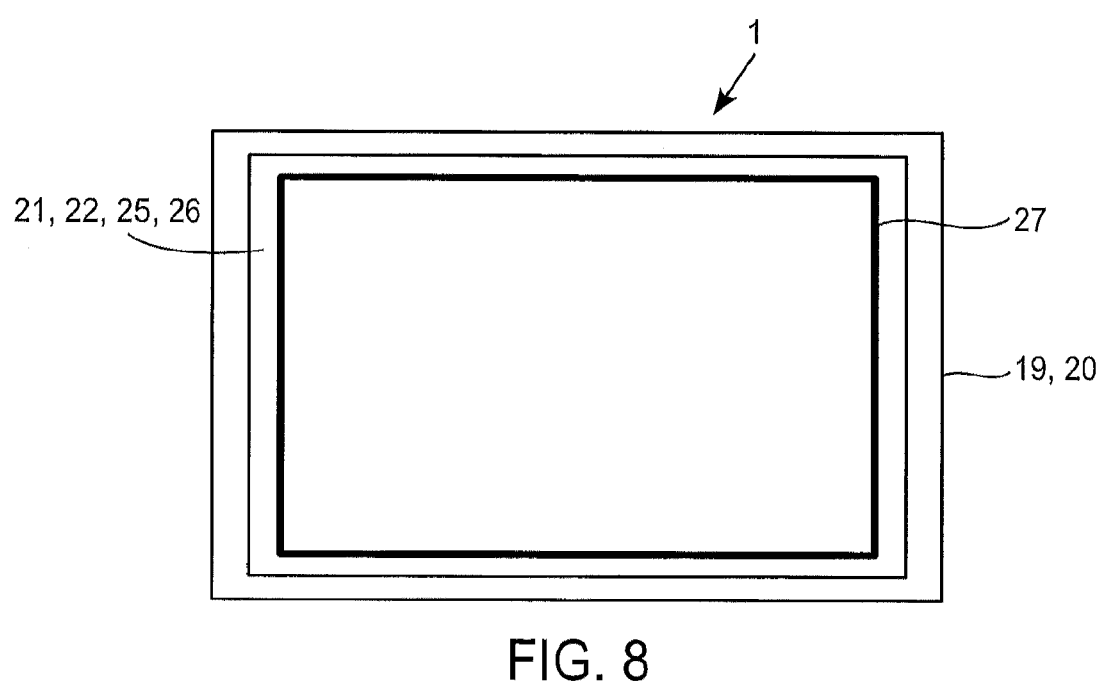
FIG. 8 is a schematic plan view of a glazing in accordance with any of the constructions shown in FIGS. 5, 6 and 7.

FIG. 8 is a schematic plan view of a glazing in accordance with any of the constructions shown in FIGS. 5, 6 and 7. Each of the coatings (either infrared-reflective or low-emissivity) 21, 22, 25, 26 is provided over the entire surface of the respective ply of glass 19, 20, except at an edge region around the periphery of the glazing 1. A busbar 27 is provided on the coating 21, 22, 25, 26, set in from the edge of and around the periphery of the coating 21, 22, 25, 26, and may be continuous or in sections. The busbar forms an electrical connection with the coating 21, 22, 25, 26 to be used as capacitive grounding for the electrodes 2, 3. The busbar 27 is electrically connected to ground via the vehicle body, on at least one side of the glazing 1. Ideally, the busbar 27 is electrically connected to ground on each side of the glazing for a continuous busbar 27, or each section is electrically connected to ground for a sectioned bus bar 27 Preferably, the busbar 27 is a strip of metal or other electrically conductive material, such as copper In each of FIGS. 5, 6 and 7, the coating 26 is remote from either electrode 2, 3 of the switchable film 12, separated by at least one ply of interlayer material. This allows the formation of a capacitor. Preferably, the coating 21, 22, 25, 26 used has a sheet resistance that is less than that of the material forming the electrodes 2, 3. Desirably, the sheet resistance should be less than 30 Ohms/□. For example, if a polyethylene terephthalate substrate having an ITO (indium tin oxide) coating is used in the construction shown in FIG. 7, the sheet resistance of the coating will typically be in the region of 5 to 6 Ohms/□. Typical sheet resistances of low-emissivity coatings are less than 20 Ohms/□.

Other suitable low-emissivity and infrared reflecting coatings and coated interlayer materials with a sheet resistance of less than 30 Ohms/□ are well known in the art, such as SIGLASOL™.

For a low-emissivity coating having an area of 0.5 m$^2$, a sheet resistance of 30 Ohms/□ and a layer of polyvinyl butyral interlayer material between the coating and the electrode of the switchable film, the capacitance provided is 17 nF. As a comparison, the case of a small strip of a metallic infrared reflective coating is considered. This strip has an area of 0.02 m$^2$ and a plastic film of thickness of 0.05 mm gives a capacitance of 7.1 nF.

In each of the glazing constructions shown in FIGS. 5, 6 and 7, the interlayer material used is preferably one of PVB (polyvinyl butyral) or EVA (ethylene vinyl acetate), although other interlayers known within the automotive glazing industry are also suitable. Preferably, the glazing material is glass, which is preferably toughened, semi-toughened or annealed silicate float glass, having a thickness in the range 1.0 to 5.0 mm. The glass may be tinted to provide a reduced optical transmission, such as GALAXSEE™ and SUNDYM™, available from Pilkington Group Limited, or clear (having no additional tint or colouring). The interlayer material used may be clear, or coloured, either by dying or printing. Other glazing materials that are suitable for use with the present invention include plastics materials, such as polycarbonate.

Figure 9:
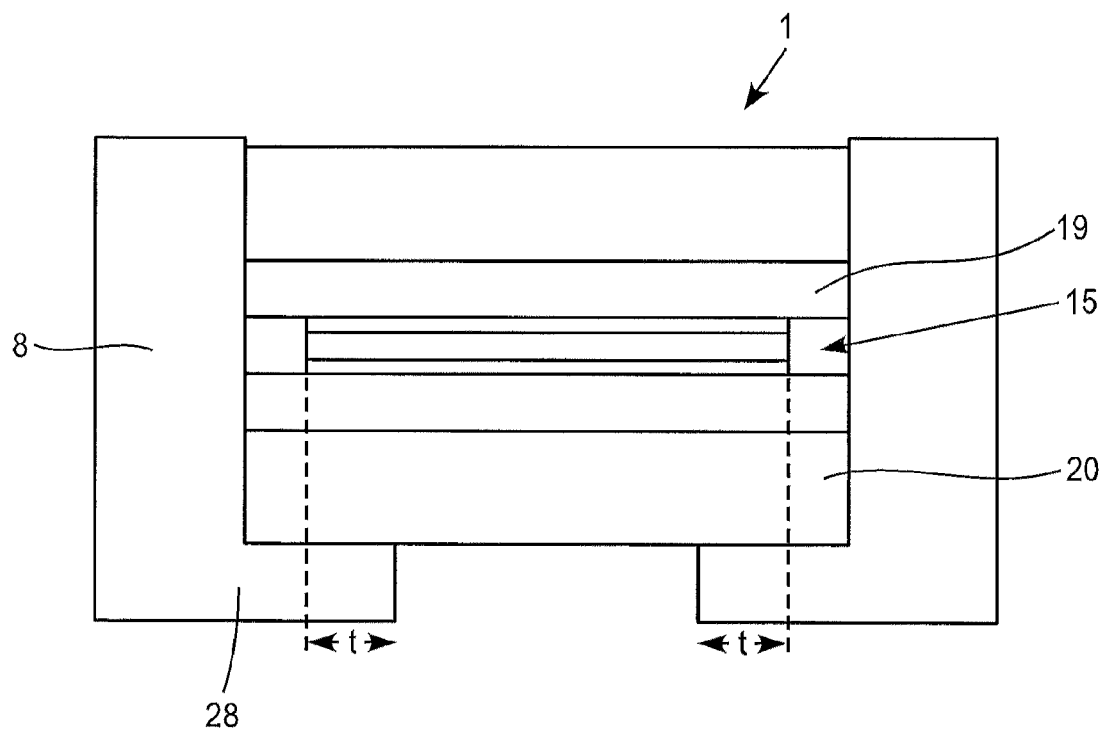
FIG. 9 is a schematic cross-section of a glazing comprising a switchable film installed in a vehicle in according to a sixth embodiment of the present invention.

FIG. 9 is a schematic cross-section of a glazing comprising a switchable film installed in a vehicle in according to a sixth embodiment of the present invention. In this embodiment, the capacitance is provided by the body of the vehicle on which the glazing sits. This is achieved by ensuring that the electrodes 2, 3 overlap the flange 28 of the vehicle body on which the glazing 1 sits. By ensuring that the flange is designed to ensure a minimum overlap t, sufficient capacitive coupling is provided to ensure that radio signal interference is eliminated.

The capacitance achieved can be estimated as follows. In vehicle body design, as typical value for the overlap, t is 10 mm overlap. This occurs all around the periphery of the glazing, approximately for a length of 2 m. The resulting capacitor has an area of 0.02 m$^2$. The distance between the electrode and the flange of the car body is approximately 4 mm, and the dielectric constant of the capacitor is approximately 2. The capacitance obtained is 88.5 pF. However, t may be any suitable value to achieve the minimum capacitive coupling necessary, depending on the design of the aperture in the vehicle body. Although FIG. 9 indicates that t has the same value around the entire periphery of the aperture, the value t may vary at different points of the aperture.

Figure 10:
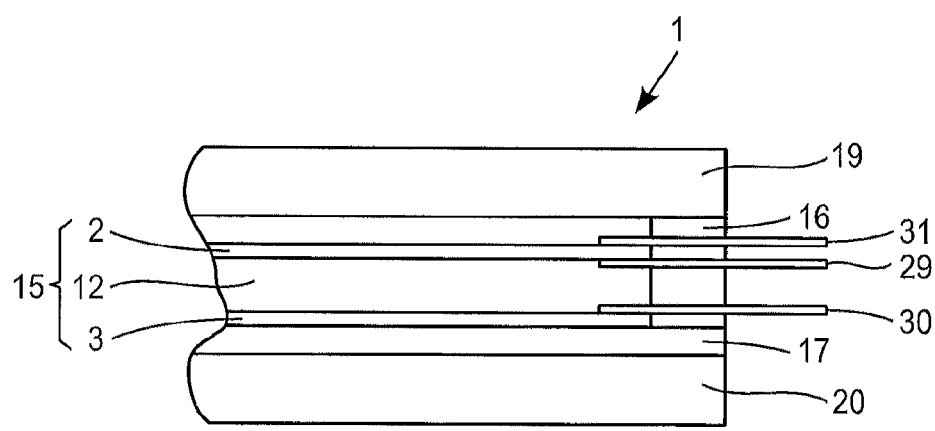
FIG. 10 is a schematic cross-section illustrating a seventh embodiment of the present invention showing a third busbar arrangement.

FIG. 10 is a schematic cross-section illustrating a seventh embodiment of the present invention, showing a third busbar arrangement. As with the sixth embodiment shown in FIG. 9, the capacitance is provided by effectively extending the vehicle body to form a plate of a capacitor, which is then connected to ground. As before, the laminated glazing 1 comprises first 19 and second plies 20 of glass having a switchable film 12 laminated therebetween. The switchable film 12 having upper 2 and lower 3 electrodes, held within a picture frame construction 15 laminated between two plies of interlayer material 16, 17. Each electrode comprises a ply of polymer material having an electrically conductive coating on one surface, and has a bus bar 29, 30 connected to each conductive surface to connect the switchable film 12 into the wiring harness of the vehicle. In order to create a capacitor, a third busbar 31 is provided, bonded to the surface of one electrode that is not provided with an electrically conductive coating. This busbar 31 forms one plate of a capacitor, the other plate of which is formed by the electrically conductive surface of the electrode 2 onto which the second busbar 29 is bonded. The third busbar comprises a strip of electrically conductive material, such as tinned copper strip or metallic tape, and is of a size determined to give an appropriate capacitance value. For example, to achieve a capacitance of 10 nF, the third busbar 31 requires an area of approximately 2820 mm$^2$. Again, it may be desirable to employ balanced grounding, by placing a fourth bonded to the surface of the second electrode 3, that is not provided with the electrically conducting coating, and capacitively connecting via this fourth busbar to electrical ground.

Figure 11:
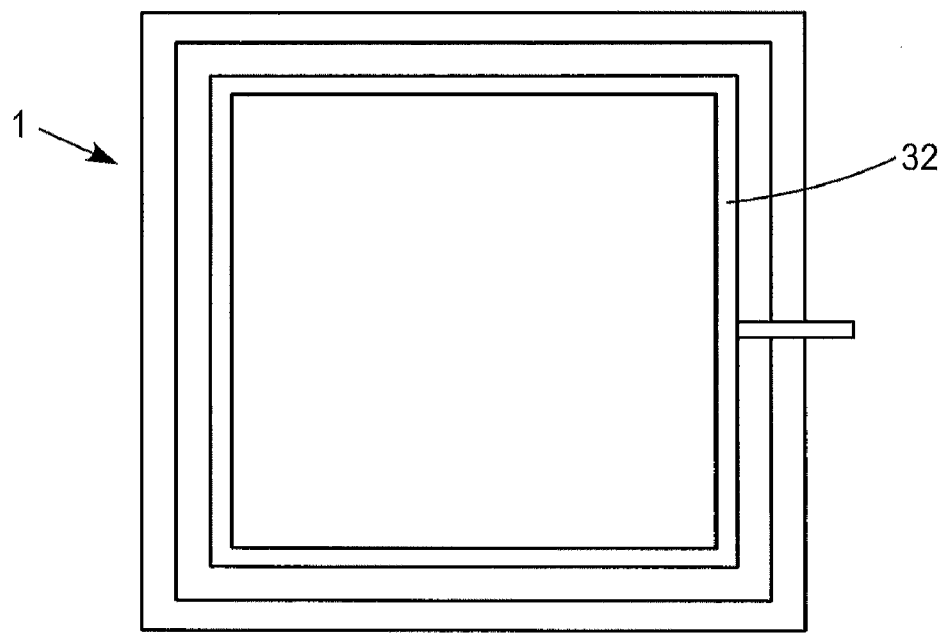
FIG. 11 is a schematic plan view of a frame-shaped third busbar.
Figure 12:
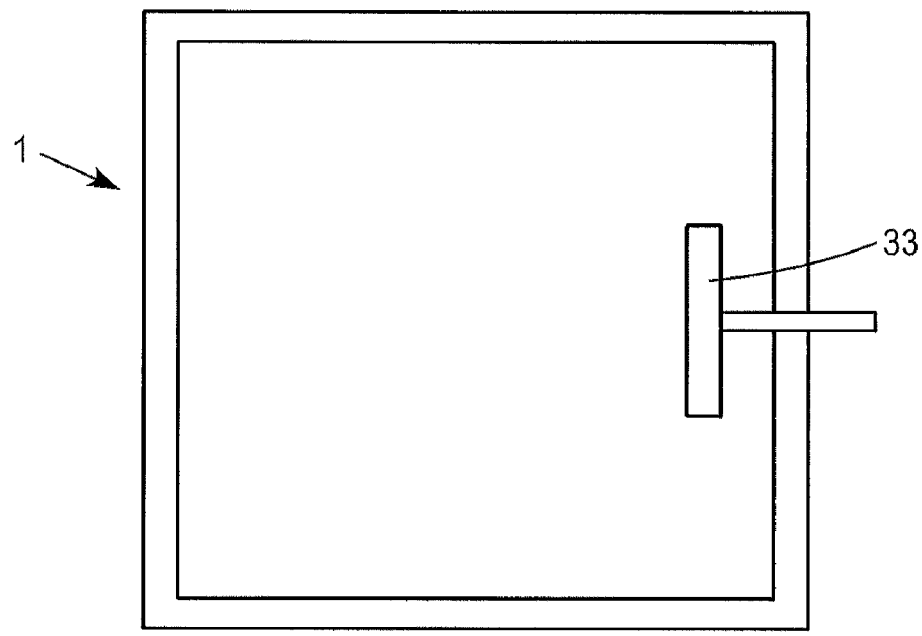
FIG. 12 is a schematic plan view of a T-shaped third busbar.

FIGS. 11 and 12 illustrate third busbar arrangements designed to give an appropriate capacitance. FIG. 11 is a schematic plan view of a frame-shaped third busbar 32, where the glazing 1 is provided with a continuous frame of electrically conductive strip, forming the plate of a capacitor. FIG. 12 is a schematic plan view of a T-shaped third busbar 33, where the cross-portion of the T-shape runs parallel with one edge of the glazing 1. In each case, the third busbar will be hidden from view by an obscuration band (not shown) in the same manner as the two busbars connecting the electrodes of the switchable film to the wiring harness of the vehicle.

These approximations show that the choice of which method of capacitive grounding is used depends on the impedance of the source of the unbalanced higher frequencies. It may be desirable to combine the embodiments described above, either with each other, or with simultaneous filtering of the electrical supply, or capacitive grounding of the electrical supply. By providing capacitive grounding onto the body of a vehicle comprising both a switchable glazing and an antenna on glass (such as a backlight), interference in the radio signal received can be avoided.

The invention claimed is:

1. Automotive vehicle having an aperture in the vehicle body in which a glazing, comprising a switchable film laminated between at least two plies of an interlayer material, the plies of interlayer material being laminated between a first ply of glazing material facing out of the vehicle and a second ply of glazing material facing into the vehicle, is fitted, the switchable film comprising first and second electrodes, both in electrical connection with a power supply, wherein the first electrode is capacitively connected to electrical ground on the vehicle body, wherein the capacitive connection comprises a capacitor formed from the first electrode and an electrically conductive element, and wherein the electrically conductive element comprises at least one of a functional coating on a portion of one surface of at least one ply of glazing material, a ply of polymer material having a functional infrared coating that is laminated between the switchable film and the first ply of glazing material, a busbar connected to a non-electrically conducting surface of the first electrode, and a part of the vehicle body that extends into the aperture to overlap the first electrode.

2. The automotive vehicle of claim 1, wherein the second electrode of the switchable film is also connected to electrical ground on the vehicle body.

3. The automotive vehicle of claim 1, wherein the electrically conductive element comprises a functional coating on a portion of one surface of at least one ply of glazing material, and the functional coating comprises an infrared reflective coating.

4. The automotive vehicle of claim 1, wherein the electrically conductive element comprises a functional coating on a portion of one surface of at least one ply of glazing material, and the functional coating comprises a low-emissivity coating.

5. The automotive vehicle of claim 1, wherein the electrically conductive element comprises a ply of polymer material having a functional infrared coating that is laminated between the switchable film and the first ply of glazing material, and wherein the laminated glazing comprises at least one layer of interlayer material interposed between the first electrode and the functional infrared reflective coating.

6. The automotive vehicle of claim 5 wherein the functional infrared reflective coating is provided with a busbar.

7. The automotive vehicle of claim 6, wherein the busbar is connected to electrical ground on the vehicle body.

8. The automotive vehicle of claim 7, wherein the glazing is at least three sides, and the busbar is connected to electrical ground along at least one side of the glazing.

9. The automotive vehicle of claim 1, wherein the switchable film is one of an SPD or an LCD film.

10. The automotive vehicle of claim 1, wherein the interlayer material is one of PVB or EVA.

11. The automotive vehicle of claim 10, wherein the interlayer material and/or the plies of glazing material are coloured.

12. The automotive vehicle of claim 1, wherein the glazing material is glass.

13. The automotive vehicle of claim 12, wherein the glass is one of toughened, semi-toughened or annealed silicate float glass.

14. The automotive vehicle of claim 1, wherein the glazing material is a plastics material.

15. The automotive vehicle of claim 1, wherein the electrical supply to the first electrode is also connected to the ground of the power supply by a capacitor.

16. The automotive vehicle of claim 1, wherein the glazing is a vehicle glazing.

17. An automotive vehicle having an aperture in the vehicle body in which a glazing, comprising a switchable film laminated between at least two plies of an interlayer material, the plies of interlayer material being laminated between a first ply of glazing material facing out of the vehicle and a second ply of glazing material facing into the vehicle, is fitted, the switchable film comprising first and second electrodes, both in electrical connection with a power supply, wherein the first electrode is capacitively connected to electrical ground on the vehicle body, wherein at least one ply of glazing material has a functional coating on a portion of one surface, wherein the laminated glazing comprises at least one layer of interlayer material interposed between the first electrode and the functional coating, wherein the functional coating is provided with a busbar, wherein the busbar is connected to electrical ground on the vehicle body, and wherein the first electrode and the functional coating form a capacitor.

18. The automotive vehicle of claim 17, wherein the functional coating has a sheet resistance of less then or equal to 30 Ohms/□.

19. The automotive vehicle of claim 17, wherein the switchable film is one of an SPD or an LCD film.

20. The automotive vehicle of claim 17, wherein the interlayer material is one of PVB or EVA.

21. An automotive vehicle having an aperture in the vehicle body in which a glazing, comprising a switchable film laminated between at least two plies of an interlayer material, the plies of interlayer material being laminated between a first ply of glazing material facing out of the vehicle and a second ply of glazing material facing into the vehicle, is fitted, the switchable film comprising first and second electrodes, both in electrical connection with a power supply, wherein the first electrode is capacitively connected to electrical ground on the vehicle body, and wherein the first electrode overlaps the edges of the aperture in the vehicle body.

22. The automotive vehicle of claim 21, wherein the region of the car body overlapped by the electrode forms a capacitor.

23. The automotive vehicle of claim 21, wherein the switchable film is one of an SPD or an LCD film.

24. The automotive vehicle of claim 21, wherein the interlayer material is one of PVB or EVA.

25. An automotive vehicle having an aperture in the vehicle body in which a glazing, comprising a switchable film laminated between at least two plies of an interlayer material, the plies of interlayer material being laminated between a first ply of glazing material facing out of the vehicle and a second ply of glazing material facing into the vehicle, is fitted, the switchable film comprising first and second electrodes, both in electrical connection with a power supply, wherein the first electrode is capacitively connected to electrical ground on the vehicle body, and wherein the switchable film is provided with first and second busbars connected to the first and second electrodes, and a third busbar, connected to a non-electrically conductive surface of the first or second electrode, forming a capacitor.

26. The automotive vehicle of claim 25, wherein the switchable film is one of an SPD or an LCD film.

27. The automotive vehicle of claim 25, wherein the interlayer material is one of PVB or EVA.

28. A method of reducing interference in radio frequency signals caused by glazings comprising switchable films, the switchable film comprising first and second electrodes in electrical connection with a power supply, comprising connecting at least the first electrode capacitively to electrical ground, wherein the capacitive connection comprises a capacitor formed from the first electrode and an electrically conductive element, and wherein the electrically conductive element comprises at least one of a functional coating on a portion of one surface of at least one ply of glazing material, a ply of polymer material having a functional infrared coating that is laminated between the switchable film and a ply of glazing material, a busbar connected to a non-electrically conducting surface of the first electrode, and a part of a vehicle body that extends into an aperture to overlap the first electrode.

29. A method of reducing interference in radio frequency signals caused by vehicle glazings comprising liquid crystal device type or suspended particle device type switchable films, the switchable films comprising first and second electrodes in electrical connection with a power supply, the method comprising connecting at least the first electrode capacitively to electrical ground, wherein the capacitive connection comprises a capacitor formed from the first electrode and an electrically conductive element, and wherein the electrically conductive element comprises at least one of a functional coating on a portion of one surface of at least one ply of glazing material, a ply of polymer material having a functional infrared coating that is laminated between the switchable film and a ply of glazing material, a busbar connected to a non-electrically conducting surface of the first electrode, and a part of a vehicle body that extends into an aperture to overlap the first electrode.

* * * * *